(12) United States Patent
Wang et al.

(10) Patent No.: US 8,566,042 B2
(45) Date of Patent: Oct. 22, 2013

(54) DIRECT CONTACT FORCE MEASUREMENT SYSTEM

(75) Inventors: Percy Wang, Tyler, TX (US); Daniel Duke, Leeds, AL (US)

(73) Assignee: Southern Research Institute, Birmingham, AL (US)

( * ) Notice: Subject to any disclaimer, the term of this patent is extended or adjusted under 35 U.S.C. 154(b) by 371 days.

(21) Appl. No.: 13/055,077

(22) PCT Filed: Jul. 20, 2009

(86) PCT No.: PCT/US2009/051184
§ 371 (c)(1),
(2), (4) Date: Apr. 22, 2011

(87) PCT Pub. No.: WO2010/011615
PCT Pub. Date: Jan. 28, 2010

(65) Prior Publication Data
US 2011/0191036 A1    Aug. 4, 2011

Related U.S. Application Data

(60) Provisional application No. 61/082,223, filed on Jul. 20, 2008.

(51) Int. Cl.
*G01L 1/00*    (2006.01)
*G01F 25/00*    (2006.01)

(52) U.S. Cl.
USPC .............. 702/42; 702/43; 702/104; 702/116; 702/182

(58) Field of Classification Search
USPC .............. 702/42–44, 81, 104, 105, 116, 117, 702/121–123, 182, 183
See application file for complete search history.

(56) References Cited

U.S. PATENT DOCUMENTS

| | | | |
|---|---|---|---|
| 7,069,135 B2 | 6/2006 | Bertrand | 701/80 |
| 7,310,997 B2 | 12/2007 | Tozawa | 73/146 |
| 2002/0092364 A1 | 7/2002 | Adderton | 73/862.41 |
| 2002/0157746 A1* | 10/2002 | Merino-Lopez et al. | 152/209.5 |
| 2003/0102966 A1 | 6/2003 | Konchin | 340/448 |
| 2003/0145651 A1 | 8/2003 | Hofmann | 73/146 |
| 2005/0159874 A1* | 7/2005 | Bertrand | 701/80 |
| 2005/0188754 A1 | 9/2005 | Ogawa | 73/146 |
| 2008/0127753 A1 | 6/2008 | Miyoshi | 73/146 |

FOREIGN PATENT DOCUMENTS

| | | |
|---|---|---|
| WO | WO/2007/000781 | 1/2007 |
| WO | WO/2007/063926 | 6/2007 |
| WO | WO/2010/011615 | 1/2010 |

OTHER PUBLICATIONS

International Search Report issued Jan. 21, 2010 by the International Searching Authority for Application PCT/US2009/051184 filed Jul. 20, 2009 (Applicant—Southern Research Institute // 1st Named Inventor—Wang) (4 pages).

(Continued)

*Primary Examiner* — Phuong Huynh
(74) *Attorney, Agent, or Firm* — Ballard Spahr LLP

(57) ABSTRACT

A system for measuring forces from a rotating object is presented. In one aspect, the measurement system has a plurality of strain sensors that are configured to attach to the sidewall of a tire of a vehicle and measure the strain on the sidewall. The system can also have a data processor to relate the strain on the sidewall to the normal force exerted on the driving surface from the tire.

24 Claims, 4 Drawing Sheets

(56) References Cited

OTHER PUBLICATIONS

Written Opinion issued Jan. 21, 2010 by the International Searching Authority for Application PCT/US2009/051184 filed Jul. 20, 2009 (Applicant—Southern Research Institute // 1st Named Inventor—Wang) (4 pages).

International Preliminary Report on Patentability issued Jan. 25, 2011 by the International Bureau for Application PCT/US2009/051184 filed Jul. 20, 2009 (Applicant—Southern Research Institute // 1st Named Inventor—Wang) (5 pages).

* cited by examiner

DIRECT CONTACT FORCE MEASUREMENT SYSTEM

This application is a National Phase Application of International Application No. PCT/US2009/051184, filed Jul. 20, 2009, which claims priority to U.S. Patent Application No. 61/082,223, filed Jul. 20, 2008, which applications are incorporated herein fully by this reference.

FIELD OF THE INVENTION

This invention relates to a direct contact force measurement system. More specifically, this invention relates to a direct contact force measurement system for use with rotating objects.

BACKGROUND OF THE INVENTION

In the industrialized nations of the world, the highway systems and the corresponding bridges are a critical part of the nation's infrastructure. The structural integrity of bridges is integrally tied to issues of both life safety and the economic health of the country. There is a growing concern over the inspection, maintenance, and functional life of the thousands of bridges in the world. One area of research related to bridge inspection, maintenance and life prediction involves measuring and/or analytically evaluating the effects of dynamic loading from vehicles on the structural condition and integrity of bridges.

SUMMARY

A system for measuring forces from a rotating object is presented. In one aspect, the measurement system comprises a plurality of strain sensors that are configured to attach to the sidewall of a tire of a vehicle. In another aspect, the strain sensors will generally be equally spaced around the mid-height of the side wall. The system can also comprise a means to protect the strain sensors from damage during handling and transit.

The strain sensors, in one aspect, can be in communication with a data processor equipped with software to process the electrical signals from the strain sensors. The data processor can also be equipped with data storage means. Additionally, the data processor can have the ability to print the data in various formats, including, but not limited to graphical form. In another aspect, the strain sensors are in communications with a data collection device, which is, in turn, in communication with the data processor.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

Figure 1:
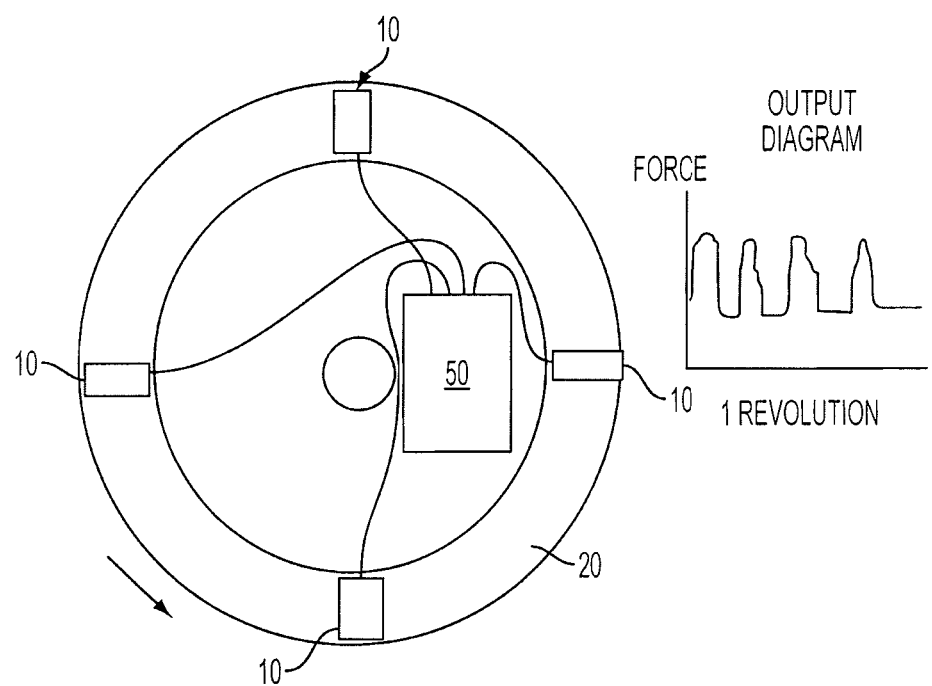
FIG. 1 is a diagrammatical view of a direct contact force measurement system according to the present invention, illustrating sensor locations and a system output diagram.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a sensor" can include two or more such sensors unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

A system for measuring determining a normal force exerted onto a surface from a rotating object is presented. In one aspect, and referring to FIG. 1, the measurement system comprises a plurality of strain sensors 10 that are configured to attach to the sidewall of at least one vehicle tire 20. It is also contemplated that the strain sensors 10 can be embedded into the sidewall of the at least one vehicle tire 20. In this aspect, the measurement system can be used to determine a normal force exerted onto a driving surface 30 from the at least one vehicle tire 20.

In another aspect, each vehicle tire of the at least one vehicle tire 20 can contain pressurized air. In an additional aspect, the at least one vehicle tire 20 can comprise at least one motor vehicle tire, including, without limitation, a car tire, a truck tire, a tractor tire, and the like.

In a further aspect, each strain sensor of the plurality of strain sensors 10 can be substantially vertical when the portion of the at least one vehicle tire 20 proximate each respective strain sensor contacts the driving surface 30. In one exemplary embodiment, the at least one vehicle tire comprises one vehicle tire, and the plurality of strain sensors 10 comprises four strain sensors. In one aspect, the at least one vehicle tire comprises a plurality of vehicle tires. It is contemplated that the plurality of vehicle tires can comprise, for example and without limitation, 2, 3, 4, 5, 6, 7, or 8 vehicle tires.

In one aspect, the strain sensors 10 can comprise means for sensing the strain on a portion of the at least one vehicle tire 20 proximate each respective strain sensor. In an exemplary aspect, the strain sensors 10 can comprise strain gauges 12 adapted to detect the strain on the sidewall of the at least one vehicle tire 20. One skilled in the art can appreciate that a strain gauge is a device used to measure the strain of an object. The most common type of strain gauge consists of an insulating flexible backing which supports a metallic foil pattern. However, other known strain gauges are also contemplated. In another aspect, the strain sensors 10 can be attached to the sidewall by a suitable adhesive, such as superglue or the like. It is contemplated that the strain sensors 10 can be equipped with their own adhesive, as well. As the sidewall is deformed, the foil is deformed, causing its electrical resistance to change. This resistance change, usually measured using a Wheatstone bridge, is related to the strain by the gauge factor, the calculation of which is conventional.

Since the air in the tire 20, or other rotating object, should act in accordance with the adiabatic gas law, the change in curvature of the sidewall can be directly correlated to the normal force that the tire exerts on the driving surface. The force between the tire 20 and driving surface 30 causes flexure in the tire sidewall near the location of the contact surface. As the tire 20 rolls, any given part of the tire rolling surface will "roll" through a loaded region into an unloaded region. The loading and unloading of the contact surface corresponds directly with sidewall flexure.

As one skilled in the art can appreciate, changes in temperature can have effects on this relationship as the object will change in size by thermal expansion, which will be detected as a strain by the gauge 12. The resistance of the strain sensor 10 may also change, as will the resistance of the connecting wires. In an effort to combat this issue, a "dummy" strain sensor 15 can be placed on the tire in a position that is not subjected to significant fluctuation in strain due to the normal force on the driving surface, but is subjected to thermal expansion. Suitable positions include, but are not limited to, a horizontal position on the tire, substantially adjacent the rim where the tire is subjected to substantially consistent strain; or 180 degrees from the sensor currently under strain. In another aspect, a dummy strain sensor 15 can be placed on the opposite side of the same tire wall, such that it would have a negative strain.

As can be appreciated, the location of the strain sensors 10 is not confined to the sidewall of the tire 20. In one aspect, the strain sensor 10 can be applied to the inside wall of the tire 20 or other sensitive area. Additionally, the strain sensors 10 can be placed on more than one tire 20. For instance, if the strain sensors 10 were to be installed to all the tires of a motor vehicle, it would be possible to simultaneously acquire force information for four or more tires at the same time. Hence, detailed data describing the loading of a vehicle onto the driving surface 30 can be acquired.

Figure 2:
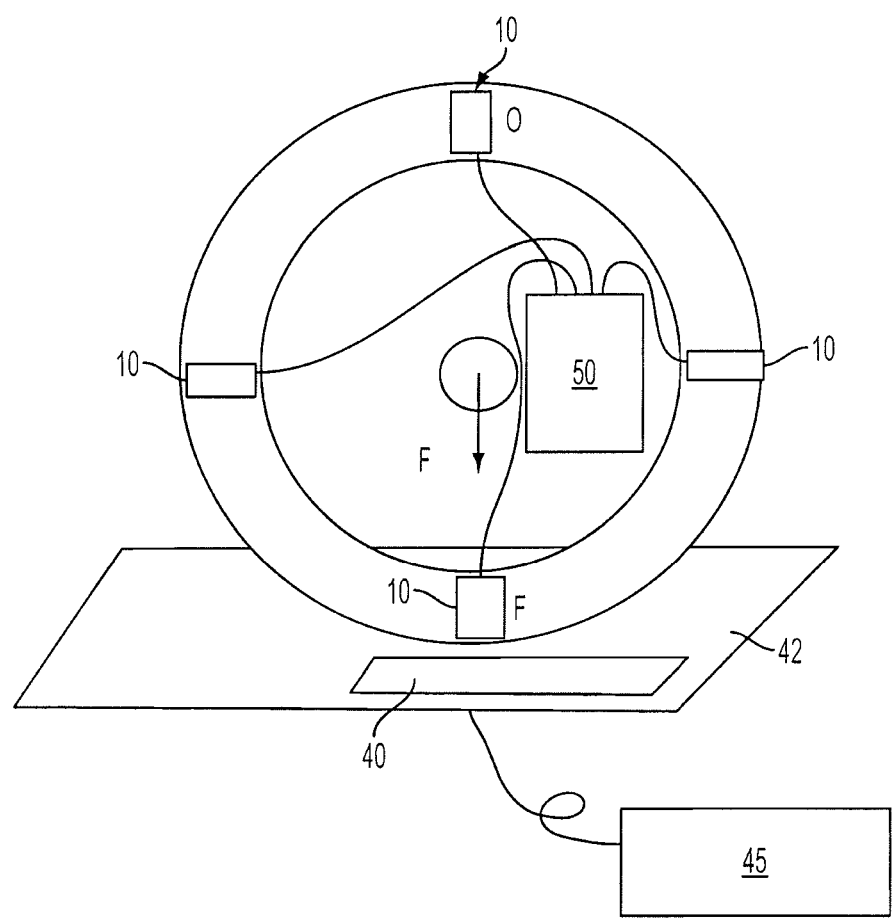
FIG. 2 is a diagrammatical view of the system of FIG. 1, illustrating the calibration of a tire when a static force of F is applied.
Figure 3:
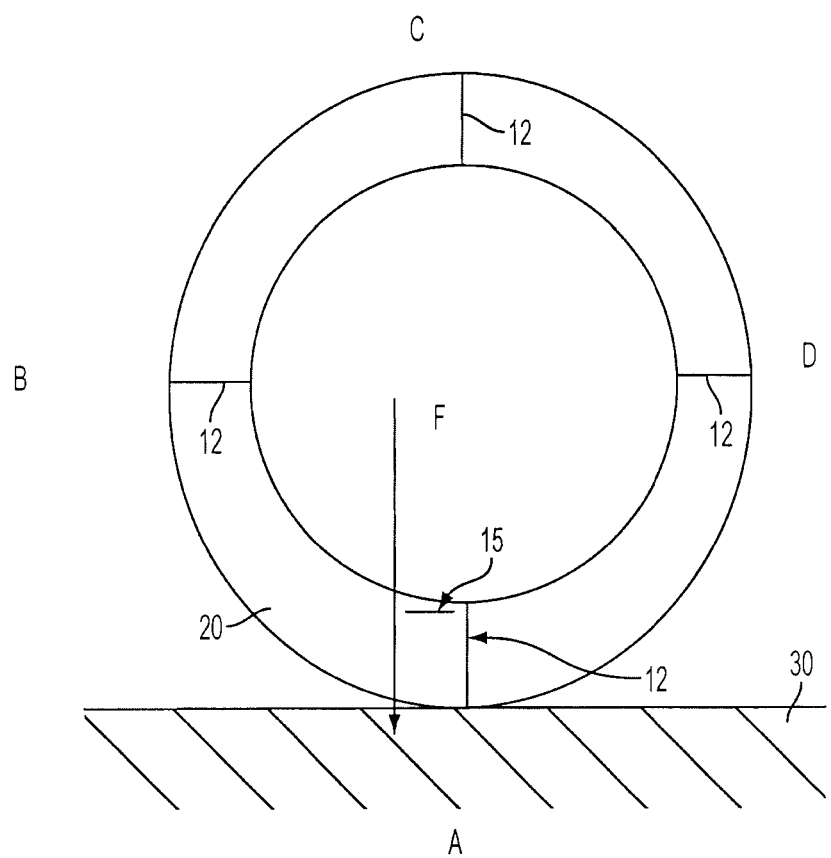
FIG. 3 is a diagrammatical view of the system of FIG. 1, illustrating the placement of a dummy sensor for temperature compensation.

In one aspect, calibration of the proposed system involves positioning the tire 20 so that a given strain sensor 10 is first at a contact position with the driving surface 30 (6 o'clock position) and then at a top position (12 o'clock). The strain sensor readings at the two positions correspond to two points on the strain sensor response curve (static wheel load and zero, respectively). Force sensors 40 can be positioned on the driving surface 30 matching the arrangement of strain sensors 10. Optionally, the force sensors 40 can be positioned on a calibration mat 42 that is placed on the driving surface 30. Then, calibration of the strain sensors 10 can be performed based on the feedback of the force sensor 40 while the tire 20 is directly on top of the force sensor. FIG. 1 illustrates an output signal depicting the measured dynamic force. Alternatively, as depicted in FIG. 2, a scale 45 can be used in combination with the force sensors 40. It is also contemplated that the scale 45 can be used in lieu of the force sensors 40. Tests can be performed at various wheel loads for a given tire, or type of tire, to determine the possible influence of nonlinearity in the force versus the strain sensor reading response. If nonlinearity is determined to be significant in the range of strain sensor readings, correction methods can be included in the software provided with the system.

In one aspect, the strain sensors 10 can be substantially equally spaced around the mid-height of the sidewall of the at least one vehicle tire 20. However, it is contemplated that other positions can also be used. The system can also comprise means for protecting the strain sensors 10 from damage during handling or transport.

As can be appreciated, the number of strain sensors 10 required is dependent on the diameter of the tire 20, the speed of the vehicle and the desired frequency range for the dynamic signal. The primary trade-off is between cost of the system (i.e., number of strain sensors) and the accuracy of the sampling frequency for the dynamic force signal.

Figure 4:
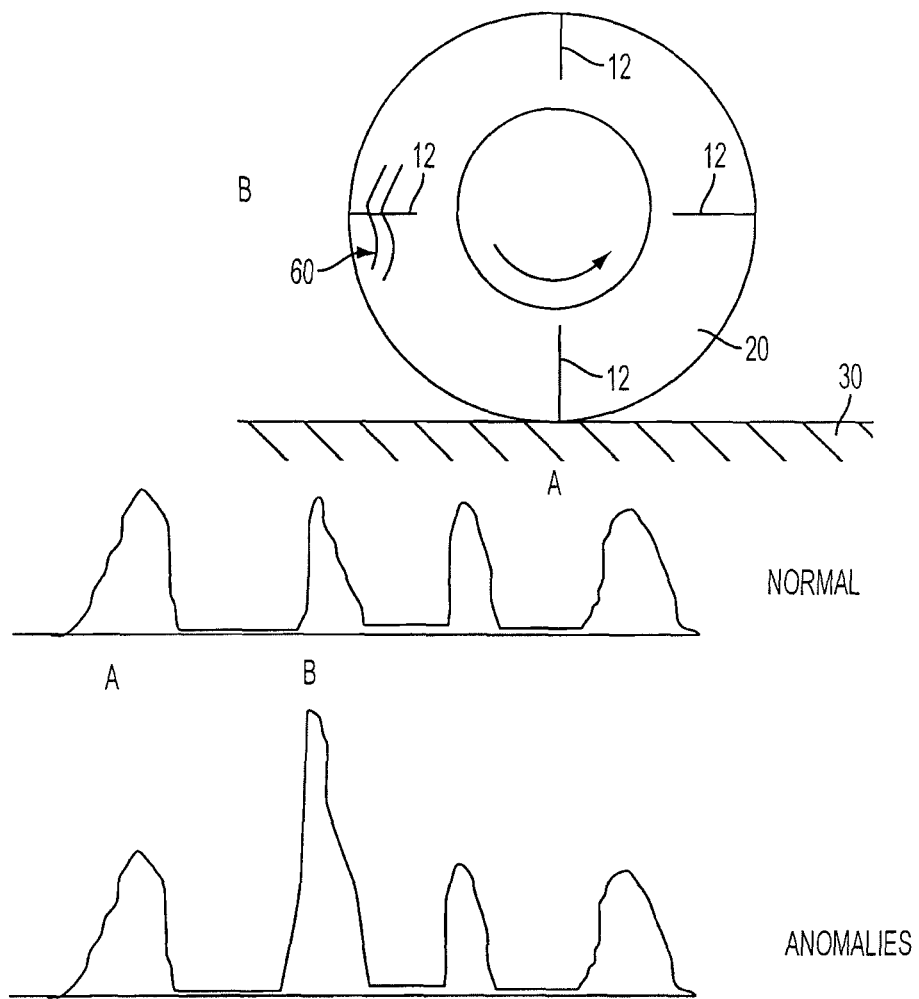
FIG. 4 is a diagrammatical view of the system of FIG. 1, illustrating anomalies in signals caused from defects in the tire.

In one aspect, the force measurement system comprises a data processor in communication with the plurality of strain sensors 10. In this aspect, the data processor can receive a strain signal from the plurality of strain sensors 10 indicative of the sensed strain on the at least one vehicle tire. In another aspect, the data processor comprises means for computing the normal force exerted onto the driving surface 30 from the at least one vehicle tire 20 based on the sensed strain on the at least one vehicle tire. It is contemplated that the data processor can comprise software for processing the strain signal received from the plurality of strain sensors 10. It is further contemplated that the data processor can be configured to filter out anomalies in the strain signal. As shown in FIG. 4, anomalies can occur, for example and without limitation, if there is a crack or other abnormality 60 in the sidewall of the tire 20. The system can also be adapted to provide information on the health of the tire (i.e., the existence of cracks, wear, etc.). In an additional aspect, the data processor can be equipped with data storage means as is commonly known in the art. Additionally, the data processor can be in communication with means for printing the data in various formats, including, but not limited to graphical form and/or display it on a display device.

In another aspect, the strain sensors 10 can be in communication with a data collection device 50, which is, in turn, can be in communication with the data processor. In this aspect, the data collection device 50 can be configured to receive the strain signal therefrom the plurality of strain sensors 10. Additionally, the data collection device 50 can be configured to selectively transmit the strain signal to the data processor. As one will appreciate, the communication between the data collection device 50 and the strain sensors 10 and data processor can be either wired or wireless. If the communication is wireless, the data collection device 50 can be equipped with a transmitter, as is known in the art. In this aspect, the data processor can be similarly equipped with a receiver. Alternatively, the data collection device 50 can merely collect the data in situ for later retrieval and transmission to the data processor. In another aspect, the data collection device 50 can be equipped with an amplifier.

In another aspect, the data collection device 50 can comprise a signal conditioner. It is contemplated that the signal conditioner can be part of the data collection or separate therefrom. As one skilled in the art can appreciate, most signals require some form of preparation before they can be digitized. As an example, thermocouple signals must be amplified before they can be digitized. Other sensors, such as RTDs, thermistors, strain gauges, and accelerometers, require electrical power to operate. Even pure voltage signals can require special technologies for blocking large common-mode signals or for safely measuring high voltages. Common types of signal conditioning that can be employed include, but are not limited to amplification, attenuation, isolation, multiplexing, filtering, excitation, linearization, cold junction compensation, and simultaneous sampling.

The invention also provides a method for determining a normal force exerted onto a driving surface from at least one vehicle tire using the force measurement system disclosed and described herein. In a first aspect, the method for determining the normal force comprises providing the plurality of strain sensors 10 as described herein. In this aspect, each strain sensor of the plurality of strain sensors can be configured to produce a strain signal. In another aspect, the method comprises attaching the plurality of strain sensors 10 to the at least one vehicle tire 20. In an additional aspect, the method comprises positioning the at least one vehicle tire 20 on the driving surface 30. In yet another aspect, the method comprises rotating the at least one vehicle tire 20. In a further aspect, the method comprises sensing the strain on the plurality of strain sensors 10 during the rotation of the at least one vehicle tire 20. It is contemplated that the strain signal from the plurality of strain sensors 10 can be indicative of the sensed strain on the at least one vehicle tire 20. In still a further aspect, the method can comprise computing the normal force exerted onto the driving surface 30 from the at least one vehicle tire 20 based on the sensed strain on the at least one vehicle tire.

In another aspect, the method can further comprise the step of calibrating the plurality of strain sensors 10 as described herein. In this aspect, it is contemplated that the strain signal can correspond to a predetermined normal force value. It is further contemplated that the predetermined normal force value can be substantially equivalent to the normal force exerted onto the driving surface 30 from the at least one vehicle tire 20.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A direct contact force measurement system for determining a normal force exerted onto a driving surface from at least one vehicle tire, the direct contact force measurement system comprising:
   a plurality of strain sensors attached to the at least one vehicle tire, the plurality of strain sensors comprising means for sensing the strain on a portion of the at least one vehicle tire proximate each respective strain sensor; and
   a data processor in communication with the plurality of strain sensors for receiving a strain signal therefrom indicative of the sensed strain on the at least one vehicle tire, wherein the data processor comprises means for computing the normal force exerted onto the driving surface from the at least one vehicle tire based on the sensed strain on the at least one vehicle tire.

2. The direct contact force measurement system of claim 1, wherein each strain sensor of the plurality of strain sensors comprises a strain gauge.

3. The direct contact force measurement system of claim 1, wherein each vehicle tire of the at least one vehicle tire has a sidewall, and wherein the plurality of strain sensors are attached to the sidewalls of the at least one vehicle tire.

4. The direct contact force measurement system of claim 3, wherein the plurality of strain sensors are embedded therein the sidewalls of the at least one vehicle tire.

5. The direct contact force measurement system of claim 3, wherein the plurality of strain sensors are substantially equally spaced along the sidewalls of the at least one vehicle tire.

6. The direct contact force measurement system of claim 1, wherein the at least one vehicle tire comprises at least one motor vehicle tire.

7. The direct contact force measurement system of claim 1, wherein each vehicle tire of the at least one vehicle tire contains pressurized air.

8. The direct contact force measurement system of claim 3, wherein the at least one vehicle tire comprises one vehicle tire, and wherein the plurality of strain sensors comprises four strain sensors.

9. The direct contact force measurement system of claim 1, wherein the at least one vehicle tire comprises a plurality of vehicle tires.

10. The direct contact force measurement system of claim 9, wherein the plurality of vehicle tires comprises two vehicle tires.

11. The direct contact force measurement system of claim 9, wherein the plurality of vehicle tires comprises four vehicle tires.

12. The direct contact force measurement system of claim 1, wherein the plurality of strain sensors are attached to the at least one vehicle tire using adhesives.

13. The direct contact force measurement system of claim 1, wherein each strain sensor of the plurality of strain sensors is substantially vertical when the portion of the at least one vehicle tire proximate each respective strain sensor contacts the driving surface.

14. The direct contact force measurement system of claim 1, wherein the plurality of strain sensors comprises a dummy strain sensor, wherein the dummy strain sensor is attached to a portion of the at least one vehicle tire that is subjected to substantially consistent strain.

15. The direct contact force measurement system of claim 1, further comprising means for protecting the plurality of strain sensors from damage during handling or transport.

16. The direct contact force measurement system of claim 1, wherein the data processor comprises software for processing the strain signal received from the plurality of strain sensors.

17. The direct contact force measurement system of claim 16, wherein the data processor is configured to filter out anomalies in the strain signal.

18. The direct contact force measurement system of claim 16, wherein the data processor is configured to display an output describing the condition of the at least one vehicle tire.

19. A direct contact force measurement system for determining a normal force exerted onto a driving surface from at least one vehicle tire, the direct contact force measurement system comprising:
- a plurality of strain sensors attached to the at least one vehicle tire, the plurality of strain sensors comprising means for sensing the strain on a portion of the at least one vehicle tire proximate each respective strain sensor;
- a data collection device in communication with the plurality of strain sensors, wherein the data collection device is configured to receive a strain signal therefrom the plurality of strain sensors indicative of the sensed strain on the at least one vehicle tire, and wherein the data collection device is configured to selectively transmit the strain signal; and
- a data processor in communication with the data collection device, wherein the data processor is configured to receive the strain signal from the data collection device, and wherein the data processor comprises means for computing the normal force exerted onto the driving surface from the at least one vehicle tire based on the sensed strain on the at least one vehicle tire.

20. The direct contact force measurement system of claim 19, wherein the data collection device comprises a wireless receiver, and wherein the data collection device is in wireless communication with the plurality of strain sensors.

21. The direct contact force measurement system of claim 20, wherein the data collection device comprises a wireless transmitter, and wherein the data processor is in wireless communication with the data collection device.

22. The direct contact force measurement system of claim 19, wherein the data collection device comprises a signal conditioner.

23. A method for determining a normal force exerted onto a driving surface from at least one vehicle tire, the method comprising:
- providing a plurality of strain sensors comprising means for sensing strain proximate each respective strain sensor, each strain sensor configured to produce a strain signal;
- attaching the plurality of strain sensors to the at least one vehicle tire;
- positioning the at least one vehicle tire on the driving surface;
- rotating the at least one vehicle tire;
- sensing the strain on the plurality of strain sensors during the rotation of the at least one vehicle tire, wherein the strain signal is indicative of the sensed strain on the at least one vehicle tire; and
- computing, using a processor the normal force exerted onto the driving surface from the at least one vehicle tire based on the sensed strain on the at least one vehicle tire.

24. The method of claim 23, further comprising the step of calibrating the plurality of strain sensors such that the strain signal corresponds to a predetermined normal force value, wherein the predetermined normal force value is substantially equivalent to the normal force exerted onto the driving surface from the at least one vehicle tire.

* * * * *